US008312270B1

(12) United States Patent
Chou et al.

(10) Patent No.: US 8,312,270 B1
(45) Date of Patent: Nov. 13, 2012

(54) DHCP-BASED SECURITY POLICY ENFORCEMENT SYSTEM

(75) Inventors: Tsunsheng Chou, San Gabriel, CA (US); Handong Wu, Los Angeles, CA (US)

(73) Assignee: Trend Micro, Inc., Tokyo (JP)

( * ) Notice: Subject to any disclaimer, the term of this patent is extended or adjusted under 35 U.S.C. 154(b) by 1052 days.

(21) Appl. No.: 11/958,042

(22) Filed: Dec. 17, 2007

(51) Int. Cl.
  *H04L 9/32* (2006.01)
  *G06F 17/00* (2006.01)
  *G06F 9/00* (2006.01)
(52) U.S. Cl. .............. 713/168; 713/171; 726/1; 726/11; 726/12; 726/14
(58) Field of Classification Search .................. 713/168, 713/171; 726/1, 11, 12, 14
  See application file for complete search history.

(56) References Cited

U.S. PATENT DOCUMENTS

| 7,533,407 | B2 * | 5/2009 | Lewis et al. .................. 726/6 |
| 7,568,092 | B1 * | 7/2009 | Englund ........................ 713/150 |
| 2004/0103310 | A1 | 5/2004 | Sobel et al. |
| 2006/0085850 | A1 * | 4/2006 | Mayfield et al. .............. 726/14 |
| 2006/0101409 | A1 * | 5/2006 | Bemmel ...................... 717/126 |
| 2006/0130139 | A1 * | 6/2006 | Sobel et al. .................. 726/22 |
| 2009/0106817 | A1 * | 4/2009 | Omote et al. ................. 726/1 |

* cited by examiner

*Primary Examiner* — Kambiz Zand
*Assistant Examiner* — Teshome Hailu
(74) *Attorney, Agent, or Firm* — Beyer Law Group LLP (57) ABSTRACT

A plug-in module of a DHCP server enforces a security policy of a computer network. The module receives a request to provide an IP address for an end-user computer. A blacklist database is consulted to determine if the computer is not in compliance with the policy. If not compliant, the module returns to the computer a special IP address, a special default gateway and a lease time; the special IP address places the computer in a restricted network segment of the network where it cannot send network packets to other computers. If compliant, the computer receives an IP address and a lease time. The first time an IP address is requested a probe is triggered to determine if the computer is compliant using software not present on the computer. A cleanup service located in the restricted segment remove malware and updates software. Lease times increase after each successful request of an IP address.

19 Claims, 8 Drawing Sheets

DHCP-BASED SECURITY POLICY ENFORCEMENT SYSTEM

FIELD OF THE INVENTION

The present invention relates generally to implementing a security policy on a computer to combat computer viruses. More specifically, the present invention relates to using the Dynamic Host Configuration Protocol (DHCP) to enforce such a security policy.

BACKGROUND OF THE INVENTION

One important job for an information technology department in a corporation or other entity is to enforce a given security policy or policies concerning user's computers. In many cases, a security policy requires that each client computer having access to a computer network comply with certain requirements designed to combat computer malware such as viruses, worms, etc. Enforcement of a security policy within a computer network is a critical part of computer security.

Computer networks can be found most anywhere, from corporations, government and education to individual's homes. Because it can be easy to join a computer network, any virus-infected computer joining the network can potentially spread the virus to any computer or device on the network. And the user of the computer might not even be aware that his or her computer is infected. As such, most computer networks follow a simple routine when a new computer attempts to join the network. Assuming that the network implements a particular security policy, a new computer attempting to join the network is first investigated to see whether it complies with the security policy or not. If not, the new computer may be denied access to the network, may be redirected to a different network, or may only be allowed access to the network for a very short period of time.

Unfortunately, many existing systems designed to enforce network security policies require installation of software on the client computer or steps to be performed on the client computer as part of the enforcement. These systems require interaction between the client computer and the network which can be complex, expensive and time-consuming. For example, U.S. patent publication No. US 2004/0103310 describes a technique for enforcing a security policy, but requires that a separate software module be present on each client computer in order to determine whether the client computer is in compliance with the security policy. Further, this technique also requires a separate DHCP proxy server separate from the actual DHCP server.

Other techniques require changes to the switch or router used by a particular client computer which can be disruptive. In addition, while a particular enforcement technique might insure that a client computer is in compliance with the security policy when the client computer first joins the network, the client computer might fall out of compliance some time after joining the network and then be infected by a computer virus, thus putting the computer network at risk.

A technique is desired that would allow a computer network to constantly enforce a security policy on its various client computers without requiring additional modifications to each client computer or to the network.

SUMMARY OF THE INVENTION

To achieve the foregoing, and in accordance with the purpose of the present invention, a DHCP-based security policy enforcement technique is disclosed that enforces a security policy within a computer network.

The present invention uses DHCP to constantly enforce a particular security policy on any number of client computers within a network. No modifications to the client computers are required and no change to any switches or routers in the network are required. A software plug-in module to the DHCP server is arranged to modify connection parameters depending upon whether the client computer is following the security policy or not. No additional computer hardware is required and no physical changes to switches, routers or other are required in order to quarantine a particular computer that is not in compliance with the security policy. A computer may be quarantined simply by providing a special IP address. In a particular embodiment, the plug-in module provides a special IP address, a new default gateway and thus a restricted network segment to the noncompliant computer in order to quarantine it. Because the computer is now in a restricted network segment, it is only allowed to route network packets to other computers in that segment, for example, computers hosting applications to assist with compliance.

In addition, no special software is required to be present on each client computer in the network. Normal users that are in compliance with a security policy would not notice any changes and are allowed to continue working normally. Computers that are not in compliance are flagged relatively quickly and are immediately quarantined such that they cannot spread any malware to other computers on the network.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

One useful protocol used in computer networks is the Dynamic Host Configuration Protocol (DHCP). The DHCP is a set of rules used by a computer in a network to allow the device to request and obtain an IP address from a server having a list of such addresses available for assignment. The protocol is used by these networked computers to obtain IP addresses and other parameters such as the default gateway, subnet mask, and IP addresses of DNS servers from a DHCP server. The DHCP server ensures that all given IP addresses are unique; in other words, no IP address is assigned to a second computer while another computer is still using the address.

In general, a DHCP server, implementing DHCP, automates the assignment of IP addresses, subnet masks, a default gateway and other IP parameters. When a client computer requests access to a network, the client computer sends a query requesting necessary information from a DHCP server. The DHCP server manages a pool of IP addresses and other parameters such as the default gateway, the domain name, the DNS servers, timeservers, etc. If successful, the DHCP server replies to the client computer with an IP address, the subnet mask, a default gateway, and other information such as a DNS server.

DHCP provides three techniques for allocating IP addresses. The first mode is automatic, in which a particular IP address is permanently assigned to a client computer from a range of IP addresses available in the network. The second is manual, in which the IP address is selected at the client computer and then DHCP protocol messages are used to inform the DHCP server that the address has been so allocated. The most commonly used technique is dynamic allocation, which provides for the reuse of IP addresses. The computer network has available a range of IP addresses, and each client computer is configured to request an IP address from the DHCP server when the client computer first requests access to the network. If successful, the client computer is provided a quote lease" on an IP address for a particular period of time. The period of time could range from hours to months. Before the lease expires the client computer requests renewal of the current IP address. If the lease expires, the client computer must request a new IP address from the DHCP server.

The present invention recognizes that knowledge and use of the Dynamic Host Configuration Protocol may be used to perform security policy enforcement on client computers in a network. By providing a plug-in software module to an existing DHCP server, an embodiment of the invention is able to change various DHCP parameters according to whether or not the client computer is following the desired security policy. These parameters that may be changed include: IP address, lease time, the default gateway, the default DNS servers, subnet mask, etc.

Figure 1:
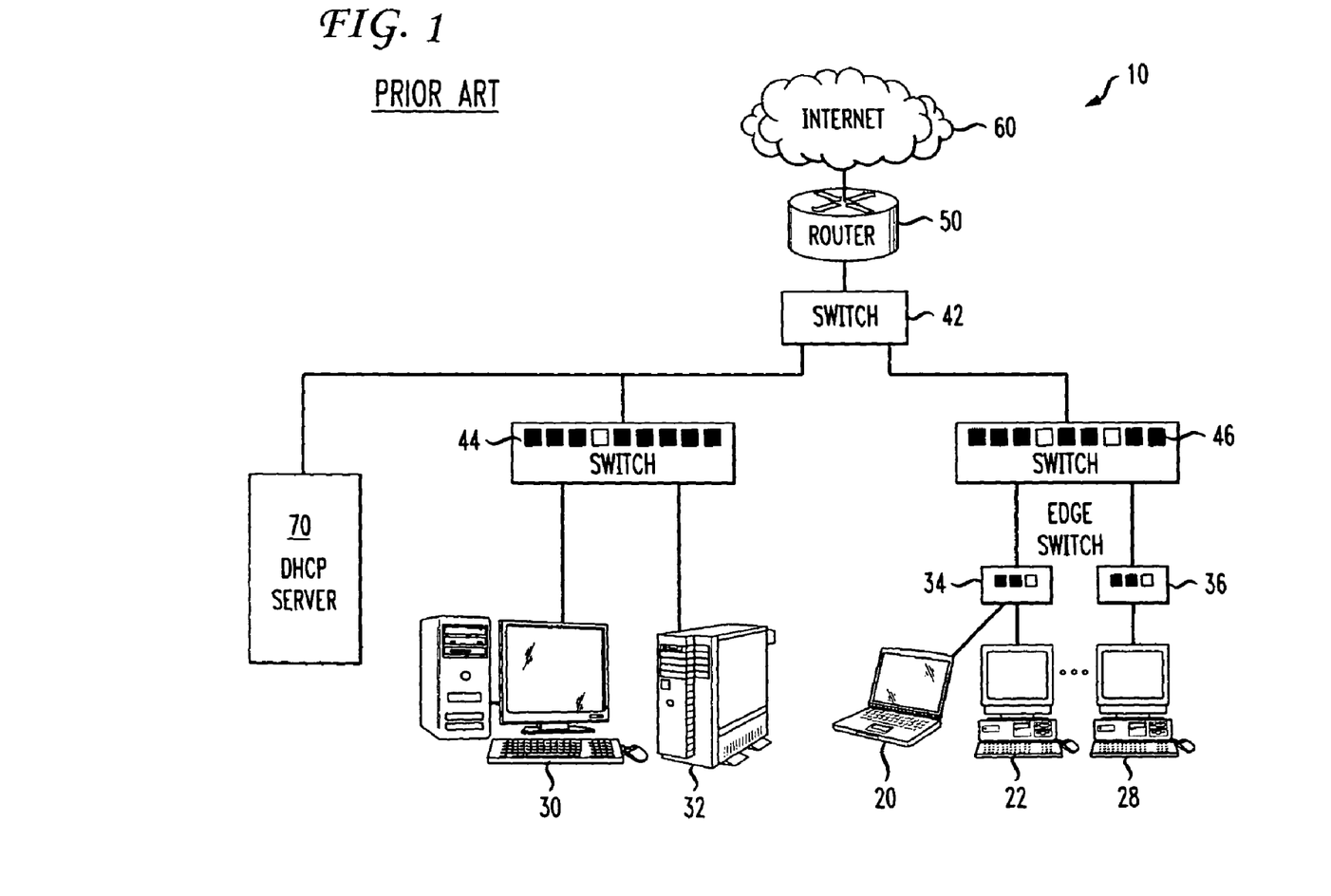
FIG. 1 illustrates a prior art computer network that implements the Dynamic Host Configuration Protocol.

FIG. 1 illustrates a prior art computer network 10 that implements the Dynamic Host Configuration Protocol. Included are any number of laptop and desktop computers 20-28, any number of computer servers and other end-user appliances 30 and 32, edge switches 34 and 36, switches 42-46, a router 50, and a DHCP server that implements IP addressing using DHCP. Also shown is a connection to the Internet 60 by which the computer network may communicate with other computers connected to the Internet. DHCP server 70 is typically found on a server computer in a corporation, located at an ISP, or in a branch office. For home users having a single computer connected to the Internet, their DHCP server is typically located at their ISP. Some users use a home router in order to build a small network inside their house; the DHCP server would then typically be inside that home router.

In general, when computer 28 starts up, restarts, reboots or attempts to connect to the network it will request an IP address from DHCP server 70 (e.g., using a broadcast UDP packet). Typically, DHCP operations include an IP lease discover request, and IP lease offer, IP lease request, and IP lease acknowledgment. Once the DHCP server 70 receives the lease discover request from computer 28, it extends and IP lease offer. The offer is a message to the computer 28 including the computer's MAC address, the IP address being offered, the subnet mask, the lease duration, the IP address of a default gateway, and the IP address of the DHCP server making the offer. Typically, the default lease time is three days. If the DHCP server is implementing a cache, it is possible that a computer restarting may receive the same IP address. Once the offer is received, computer 28 sends a message including the IP address of the server making the offer. When this message is received by DHCP server 70 it initiates the final phase of the configuration process by sending an acknowledgment packet back to computer 28. The packet includes the lease duration and other configuration information. Computer 28 may then use the IP address (and the computer network and Internet) until the lease time expires. Typically, the computer will request a renewal of the lease before it expires.

Security Policy Enforcement System

Figure 2:
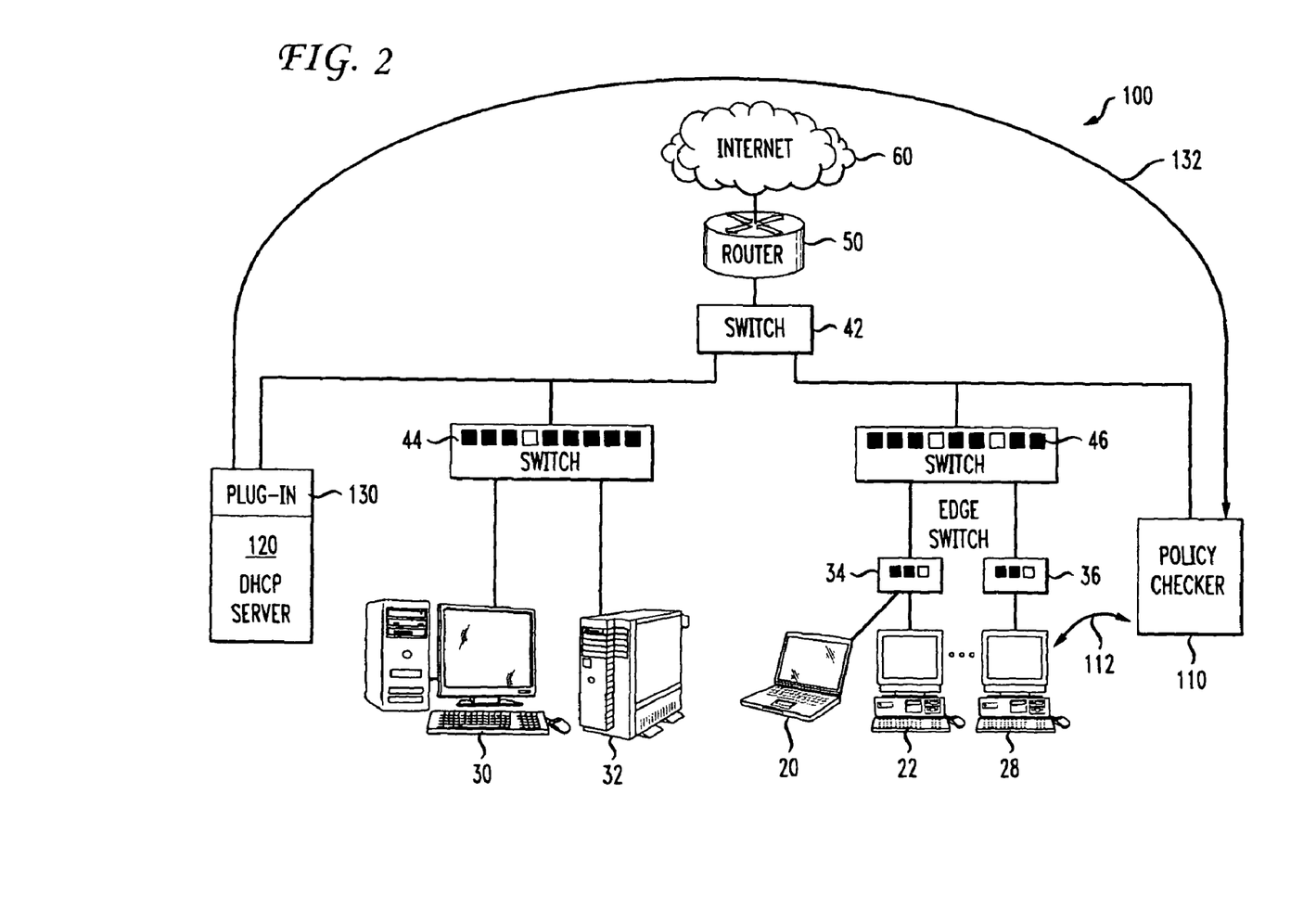
FIG. 2 illustrates a computer network that uses the Dynamic Host Configuration Protocol to help enforce a security policy of the network.

FIG. 2 illustrates a computer network 100 that uses the Dynamic Host Configuration Protocol to help enforce a security policy of the network. Devices of network 100 may be the same as those found in network 10 of FIG. 1 excepting that network 100 also includes a policy checking module 110 and a modified DHCP server 120. DHCP server 120 also includes a plug-in software module 130. In this embodiment, it is assumed that computers within network 100 must use DHCP as the means to receive an IP address, and that DHCP server 70 uses dynamic allocation. If a computer were able to use a different means to receive an IP address it might be able to bypass important advantages of the present invention. Further, DHCP server 120 is arranged such that it supports a plug-in module or a loadable software module. Typically no changes are needed to the DHCP server because either the DHCP server has an open API or the system can intercept the network traffic in the DHCP server.

As is known in the art, a plug-in module is a computer program that interacts with a host application (such as the DHCP server) to provide a specific function. Plug-ins enable third-party developers to create capabilities to extend an application, to support features yet unforeseen, to reduce the size of an application, and to separate source code from an application. The host application provides services that a plug-in can use, including a way for the plug-in to register itself with the host application and a protocol by which data is exchanged with the plug-in. A plug-in is dependent on these services provided by the host application and does not usually work by itself. Conversely, the host application is independent of the plug-in, making it possible for a plug-in to be added and updated dynamically without changes to the host application. An open application programming interface typically provides a standard interface, allowing third parties to create plug-ins that interact with the host application. In another embodiment, DHCP server 120 uses an application programming interface (API) to make a call to a third party software application in order to implement the below describe functionality. Some DHCP servers may not provide an API to let a third party add plug-ins. In that situation, though, the present invention uses a network driver as a plug-in to intercept network traffic in the DHCP server.

One of skill in the art will appreciate that other techniques similar to the plug-in module, loadable module, may also be used to implement the below describe functionality. For example, module 130 may take the form of an extension or add-on software. Or, the operating system runs the DHCP server and runs the loadable module. For ease of explanation, the below description assumes that a plug-in module 130 is used. This module may be written in a programming language such as C or C++.

In a first step, computer 28 starts up or otherwise attempts to connect to the network and requests an IP address from DHCP server 120. Plug-in module 130 intercepts this request (or is asked by the DHCP server to become involved in the request) and directs the DHCP server to reply to computer 28 with an IP address, an IP address of a default gateway, and a short lease time (for example, three minutes) in addition to other information provided to computer 28. Any other suitable short lease time may be used such as on the order of seconds, minutes or hours, although is preferable to use a lease time of a few minutes. The lease time may be set by an IT administrator having access to DHCP server 120. The lease time is the time allowed for the policy checking module 110 to probe computer 28. Typically, the lease time depends on the network traffic load and the startup time of computer 28 in order to be ready for the probe. In a modern computer and network, three minutes are typically enough. But, some slower computer and networks may take longer, and therefore a longer lease time is appropriate.

Next, plug-in module 130 notifies policy checking module 110 via communication 132 that it should perform a security policy check of computer 28. Module 130 knows the identity of computer 28 because of its previous request and transmits this identification information (such as the computer's MAC address) to policy checking module 110. Module 110 then probes computer 28 via link 112 to see if the computer is following the current security policy. Module 110 is a software module that may be hosted on any computer in the network 100 and need not be hosted directly on each and every end-user computer in the network.

As is known in the art, computer networks use special application software designed to check if a computer is in compliance with the security policy or to check for vulnerabilities of a client computer. For example, the software product "Network VirusWall" available from Trend Micro, Inc. of Cupertino, Calif. controls network access by ensuring that devices—managed or unmanaged, local or remote—comply with corporate security policies before they can access the network. Other examples of policy checking software that checks for vulnerabilities or that checks for compliance include "Network Security Risk Assessment" from eEye Digital Security.

A security policy for a given computer network may include many different components. For example, the policy may require that certain antivirus software applications be installed and that these applications be kept up to date. Also, the policy may require that the computer's operating system be updated to the latest version and that any security patches be installed, or that special encryption software be used. Other examples of components of a security policy include Data Leakage Prevention software, backup/recovery software or VPN (Virtual Private Network) software.

If it is determined that a computer is infected with a computer virus, worm or other malware, an automatic determination of "not in compliance" is made, even if the computer is otherwise implementing the current security policy. The advantage of making this automatic determination is that an infected computer will immediately be placed on the blacklist and will be quarantined the next time it asks for an IP address. In addition, antivirus software or the policy checking module may unilaterally remove an infected computer from the network or isolate it in some fashion. Once the probe is complete, policy checking module 110 has reached a determination as to whether computer 28 is in compliance with the current security policy of computer network 100.

Figure 3:
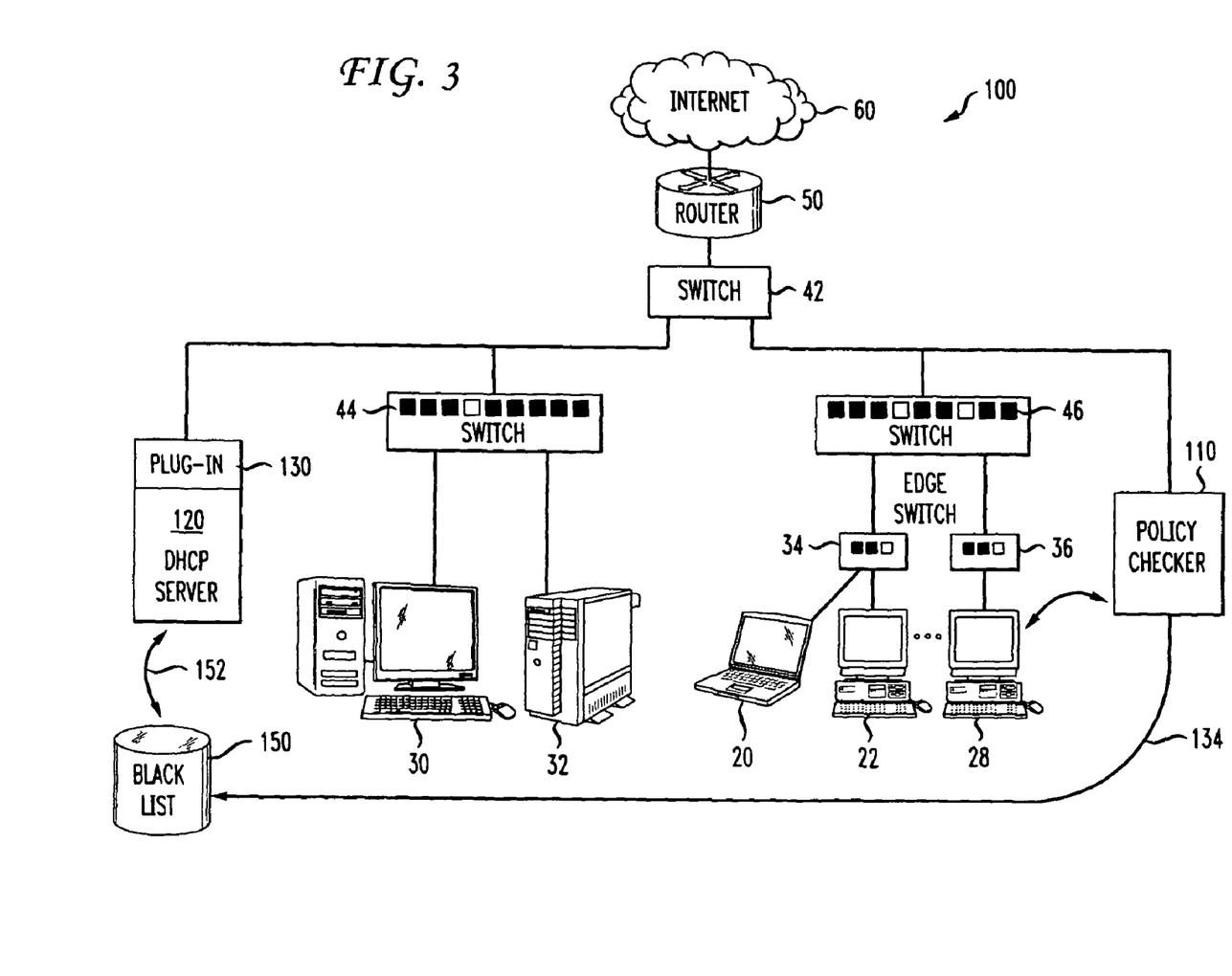
FIG. 3 illustrates a computer network implementing a further step to enforce a security policy of the network.

FIG. 3 illustrates a computer network 100 implementing a further step to enforce a security policy of the network. Network 100 also includes a blacklist database 150 that holds identifying information for computers found in the network that do not currently comply with the security policy. Database 150 may be any suitable list, database, table or other data structure suitably arranged to hold such identifying information. In one specific embodiment, database 150 is implemented using the MySQL or LiteSQL database. If the policy checking module 110 determines that computer 28 is not in compliance with the current security policy of the network, then the IP address and the MAC address of computer 28 are added to the blacklist database 150. Database 150 also keeps track of how many times a particular computer asks the DHCP server for an IP address. This "number of times" information may be stored in conjunction with the identifying information, may be separate within database 150, may be a separate database associated with DHCP server 120, or may be stored in association with plug-in 130.

Figure 4:
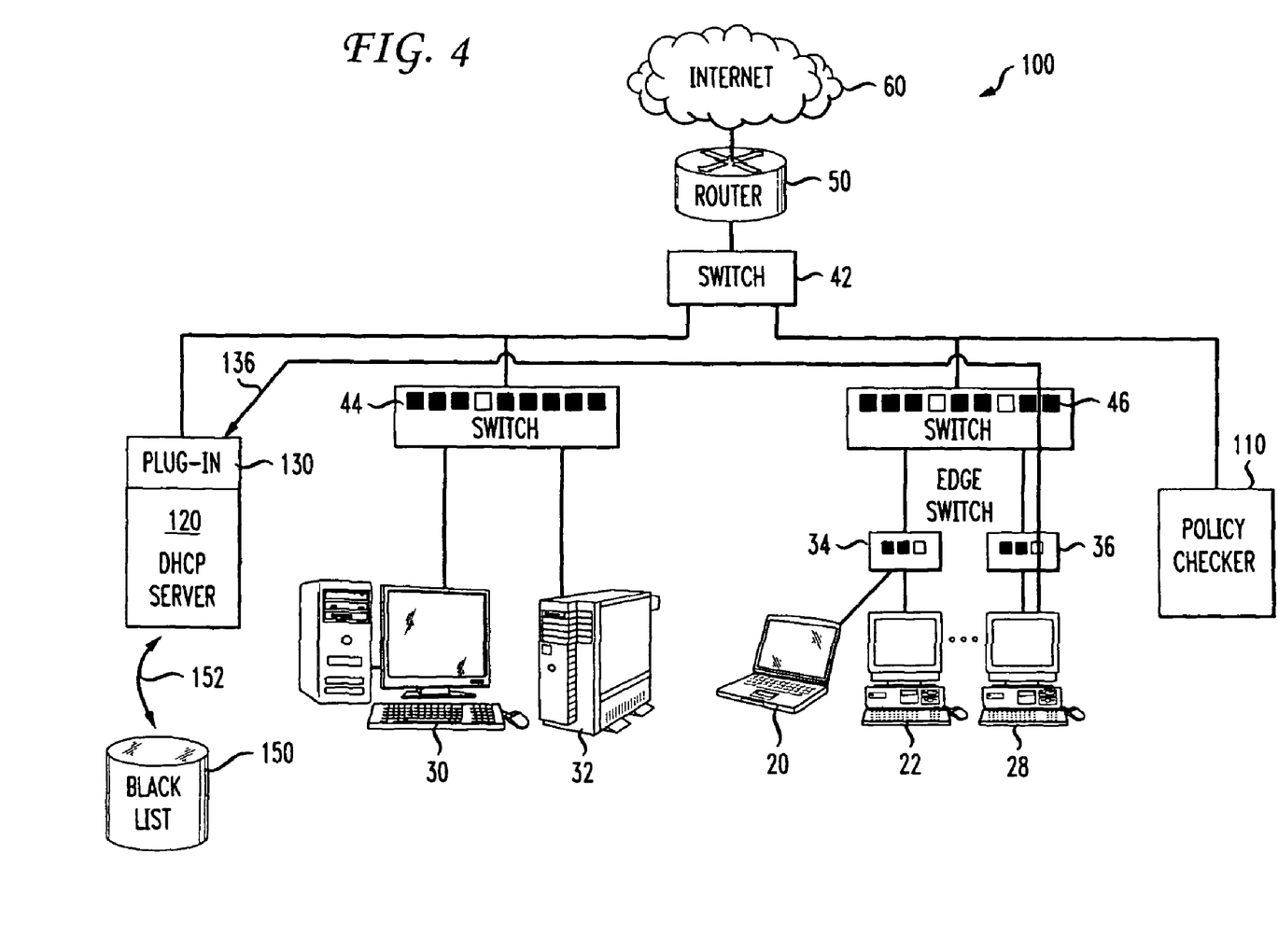
FIG. 4 illustrates a computer network implementing a further step to enforce a security policy of the network.

FIG. 4 illustrates a computer network 100 implementing a further step to enforce a security policy of the network. Because computer 28 has only received a relatively short lease time, it must request that this lease be renewed before the lease expires. In other embodiments, the computer asks for a new lease immediately after the old lease expires. Thus, use of a relatively short lease time forces computer 28 to ask for a new lease, allowing its compliance with the current security policy to be checked. Computer 28 asks to renew the lease via communication 136 and this communication is intercepted or handled by plug-in module 130. Each time that the computer asks for a lease or asks to renew a lease, a running total is updated in the "number of times" database within database 150.

Figure 5:
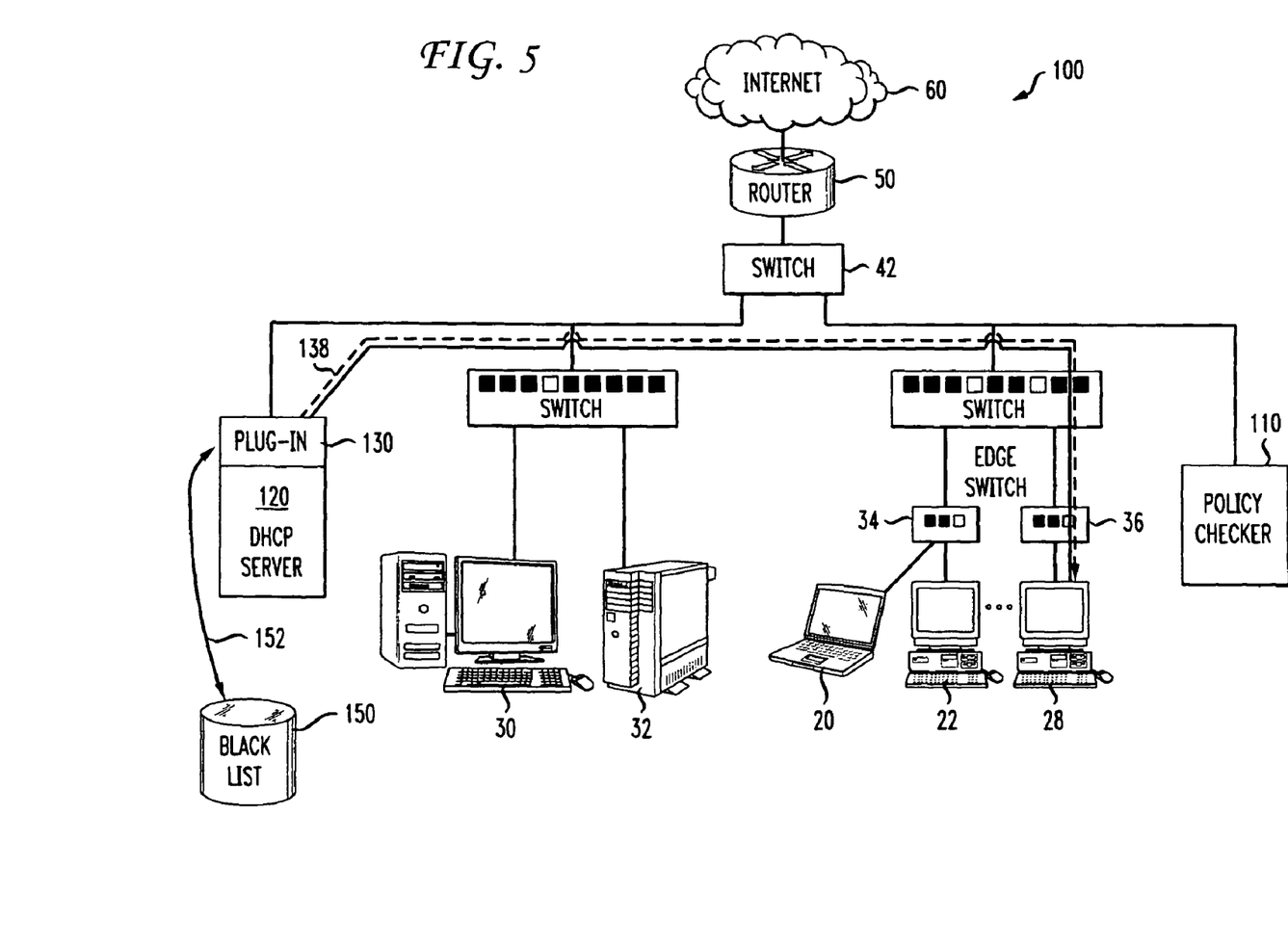
FIG. 5 illustrates a computer network implementing a further step to enforce a security policy of the network.

FIG. 5 illustrates a computer network 100 implementing a further step to enforce a security policy of the network. When plug-in module 130 receives a request for the new lease, it checks the blacklist to see if the requesting computer is present on the blacklist (meaning that the computer is not in compliance with the security policy). If the computer is not present on the blacklist then the plug-in module directs the DHCP server to return the appropriate IP address and a longer lease time than before (for example, a few hours rather than a few minutes). But, if the computer is present on the blacklist then the plug-in module directs the DHCP server to return to a quarantine IP address to computer 28 in order to effectively remove the computer from the computer network.

The plug-in module may direct that the noncompliant computer be quarantined, removed from the network, or restricted in many different ways. For example, the DHCP returns a special subnet mask or non-reachable default gateway to the computer, thus effectively removing the computer from the network. As is known in the art, a gateway is a hardware appliance (or box) such as a switch. In a preferred embodiment, the DHCP server (via the plug-in module) returns a special gateway address to the noncompliant computer thus effectively placing that computer in a restricted network.

Figure 6:
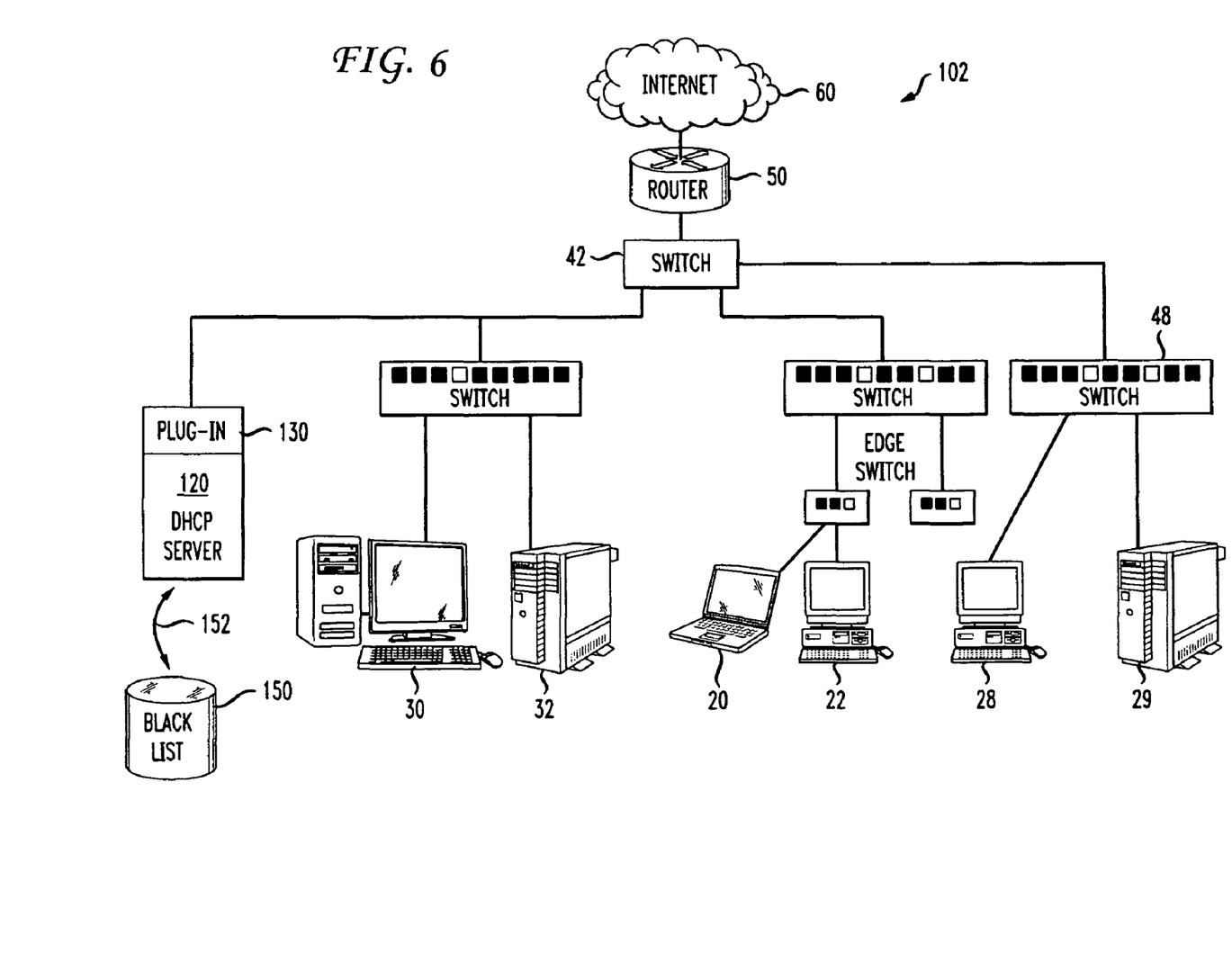
FIG. 6 illustrates a computer network implementing a further step to enforce a security policy of the network.

FIG. 6 illustrates a computer network 102 implementing a further step to enforce a security policy of the network. In this embodiment the plug-in module has returned to computer 28 a special IP address (for example, "5.5.5.5") that reassigns computer 28 to a different gateway 48. In this example, gateway 48 is a switch and can route traffic to a particular network. Thus, because computer 28 must use switch 48 to access the rest of the network or the Internet, it is effectively removed from the rest of the network and only has access to a small, restricted network that only includes computers and devices connected to switch 48. Preferably, the computer receives both the special IP address and an IP address for a default gateway. Or, the subnet mask and the default DNS server are changed to achieve a different level of quarantine.

In this simple example, the only other device on this restricted network is computer 29 which provides remedies for noncompliant computers such as access to the required antivirus software and updates, and operating system updates and patches. Depending upon the implementation of switch 48, computer 28 might have access to the Internet but not the rest of network 102. As is known in the art, switches 42 and 48 and DHCP server 120 are arranged to prevent computer 28 from accessing the rest of the network, such as computers 20, 22, 30 or 32. Any attempt by computer 28 to access another computer on the network 102 will be blocked by switch 48. As shown, switch 48 connects to switch 42. Thus, all traffic from computer 28 must go through switch 48. The network administrator will have configured switch 48 to be reachable from all computers that might possibly need to be quarantined. Preferably, computer 28 receives both a different gateway and a different IP address in order to be quarantined.

Flow Diagram Embodiment

Figure 7:
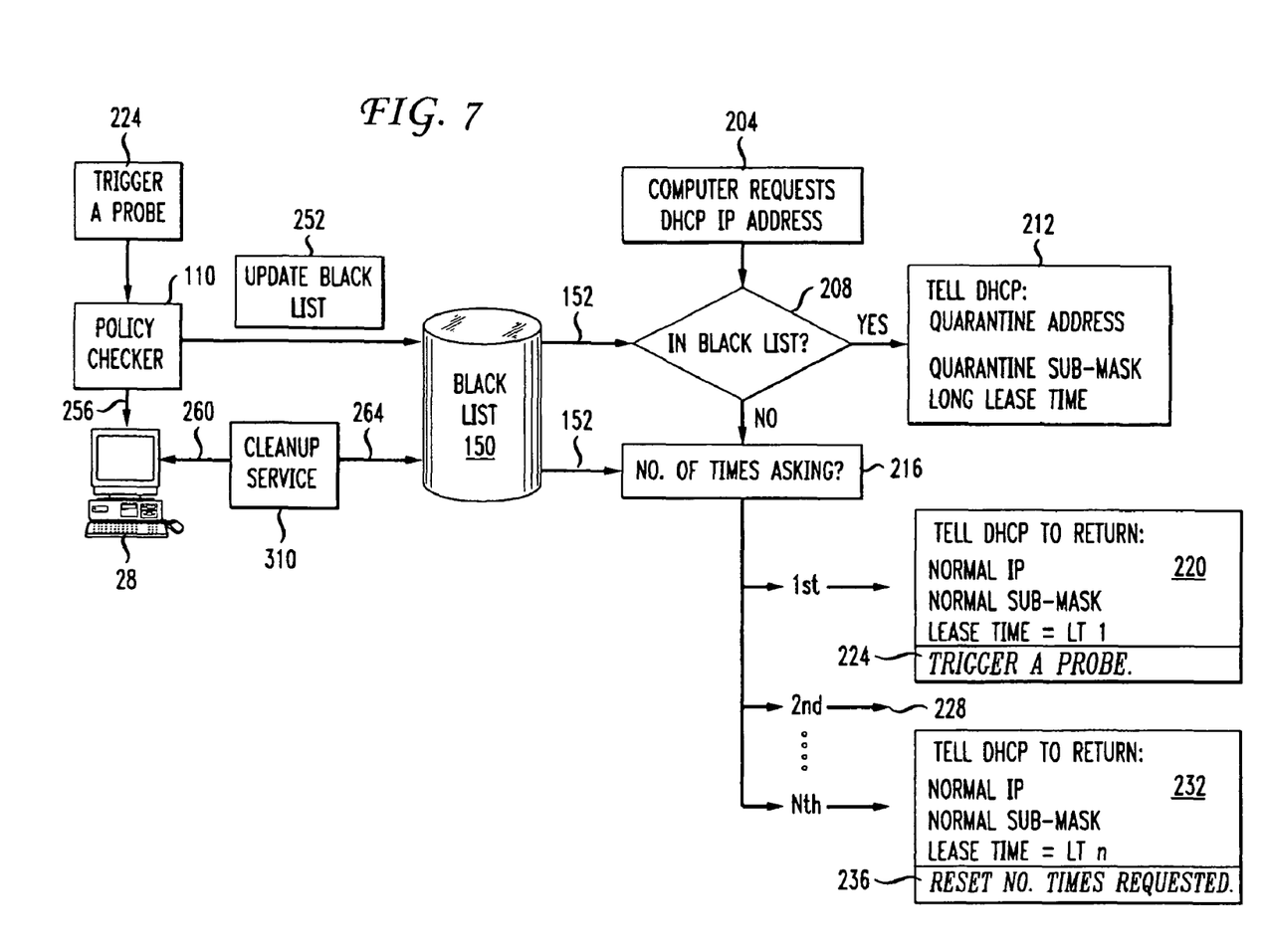
FIG. 7 is a flow diagram illustrating one embodiment by which the plug-in module enforces compliance within the computer network.

FIG. 7 is a flow diagram illustrating one embodiment by which the plug-in module 130 enforces compliance within the computer network. In this embodiment it is assumed that most computers will be in compliance with the security policy and thus there is no need to automatically quarantine a computer when it first joins the network. Optionally, it would be possible to assume that any new computer is not in compliance or is infected with a computer virus and then automatically quarantine that computer. This approach, though, creates more overhead for the network and makes it more difficult for a user first joining the network to get any work done. By assuming that most computers will be in compliance, and then initially assigning a very short lease time, the present invention reduces overhead yet allows a security policy check to be performed straight away.

In step 204 a computer (such as computer 28) requests an IP address from DHCP server 120. The request may be due to the computer restarting, joining the network, renewing a lease, or transferring from a different network, etc. Plug-in module 130 intercepts this request and updates the running total in the "number of times" database (reflecting how many times this computer has requested an IP address). In step 208 the plug-in module checks blacklist 150 and receives an indication via link 150 as to whether that computer is present in the blacklist. If so, in step 212 the plug-in module instructs the DHCP server to return to the computer: a special quarantine IP address (such as "5.5.5.5"); a special quarantine subnet mask (if needed); and a relatively long lease time. For example, a lease time on the order of days (e.g., three days) is provided to reduce overhead in the network and to allow the computer to perform remedial actions until it comes into compliance. Once the computer receives its quarantine IP address it will not be able to access the rest of the network and preferably will only be able to access a device such as computer 29 that includes resources for coming into compliance with the security policy.

Assuming though that in step 208 the plug-in module determines that the requesting computer is not on the blacklist, then in step 216 the plug-in module determines using the "number of times" database how many times has this computer now asked for an IP address. If this is the first time that this computer has requested an IP address then in step 220 the plug-in module instructs the DHCP server to return to the requesting computer: a normal IP address; a normal subnet mask (if needed); and a relatively short lease time, LT1. Preferably, this lease time LT1 given out for first-time requests is the shortest lease time given out and is on the order of a few minutes, for example, anywhere from one minute to ten minutes, preferably about three minutes.

At the same time, the plug-in module triggers a probe 224 and directs the policy checking module 110 to probe 256 the requesting computer 28 to see if it is following the current security policy. If the policy checking module determines that the requesting computer is not in compliance, then an identification of this computer is added to the blacklist via update 252. If the computer is in compliance, then no action is taken. The advantage of providing at least a lease time of a few minutes, while still keeping the lease time under ten minutes (for example) is that while the user is allowed to get on the network initially (upon startup, for example) and perform some work, a probe of his or her computer occurs very quickly. If the computer is not in compliance or is infected, it can be placed on the blacklist and removed from the network within a few minutes. Alternatively, an infected computer may be immediately removed from the network by antivirus software or by the policy checking module.

On the other hand, if this is the second or greater time that this computer has come asking for an IP address, then in step 228 the computer also receives a normal IP address, a normal subnet mask (if needed) and a lease time greater than or equal to the previous lease time (second time receives a lease time of LT2, third time receives a lease time of LT3, etc.). A probe is preferably not conducted of the requesting computer by policy checking module 110 for the second or greater request.

On the Nth time that a requesting computer asks for an IP address in step 232 the usual information is returned and again no probe is triggered. In addition, the database 150 that keeps track of how many times this computer has requested an IP address is reset to zero (i.e., the running total is set to zero). Thus, the next time that this computer requests an IP address it will be considered the first time and a probe will be triggered in step 224. In one embodiment, N is set equal to a value such as three or four such that on the third or fourth time through the running total is reset to zero such that the next time through a probe will be triggered. Of course, N may have any suitable integer value.

Cleanup service 310 is any suitable cleanup software application or other application that assists a blacklisted computer in complying with a security policy. For example, a product such as "HouseCall" available from Trend Micro may be used. HouseCall is an application that checks whether a computer has been infected by viruses, spyware, or other malware. HouseCall performs additional security checks to identify and fix vulnerabilities to prevent reinfection of a computer. Or, a product such as "Damage Cleanup Services" (DCS) also available from Trend Micro can restore infected client computers to full operational health. DCS removes spyware, root kits, worms, virus remnants and Trojan horses. DCS also repairs system registries and memory. Examples of other cleanup services include "FreeScan" from McAfee and "Free Virus Scan" from Kaspersky Lab.

Such a cleanup service may be located on the Internet and may clean a quarantined computer remotely, or cleanup service 310 may be located within a company network such as on computer 29. Computer 29 is preferably in the same network segment as any blacklisted computer, i.e., noncompliant computers are given a quarantined IP address that places them in the same network segment as computer 29 hosting the cleanup service 310. The cleanup service may be invoked automatically upon direction of the plug-in module when a noncompliant computer is first given a quarantined IP address, may be invoked periodically to scan any computers in its network segment, or maybe invoked manually by the user of the noncompliant computer. Cleanup service 310 via link 260 then performs a scan, search or other analysis of the noncompliant computer in order to identify and remove any malware, identify antivirus updates or operating system patches needed, perform any updates needed, and otherwise cleans and ensures that the subject computer is now in compliance with any security policy of the network 102.

If the subject computer cannot be brought into compliance, then the cleanup service generates an alert in the form of an e-mail message, pop up window, status reports, printout, or other, indicating to the user or system administrator that the computer is not in compliance. If, however, the computer is brought into compliance with the security policy, computer 29 updates blacklist 150 in order to remove the identification of that newly complying computer, and instructs the computer to request a new IP address from DHCP server 120. Because the computer is no longer on the blacklist, when it requests a new IP address it then should be given a normal IP address. Preferably, the cleanup service also resets the "number of times" running total for this computer back to zero.

Plug-in Module Implementation

As mentioned above, plug-in module to 130 may be implemented in different fashions. In one particular embodiment the plug-in module is able to intercept or otherwise monitor DHCP requests from a client computer, can access database 150 to determine if a computer is on the blacklist and to determine how many times the computer has asked for an IP address, and can accept other suitable input. In terms of output, the plug-in module is arranged to provide DHCP configuration parameters to a requesting computer such as an IP address, an IP address of a default gateway, a subnet mask, and a lease time. If the computer is on the blacklist the plug-in module would provide a quarantined IP address, a quarantined subnet mask, and different default gateway. In addition, the plug-in module is arranged to trigger a probe of a requesting computer via the policy checking module and is also able to reset the running total of the number of times the computer has requested an IP address. The plug-in module may also direct cleanup service 310 to scan a computer that has been placed on the blacklist. An administrator may also change parameters of the plug-in module, for example, the quarantine IP address range, the default gateway, lease time, etc.

In a specific embodiment, the plug-in module provides the following default lease times to requesting computers. For the first request, the lease time is three minutes; thereafter, the lease time is doubled until the lease time reaches three days. Of course, lease time is a configurable parameter and depends on administrator settings. Other values may be used. For example, upon the first request the computer receives a lease time of 30 seconds, upon the second request it receives a lease time of 1 minute, the third time it receives 3 minutes, the fourth time it receives 10 minutes, and the fifth and any subsequent times it receives a lease time of 3 days.

As described above, blacklist database 150 includes not only identifying information for each noncompliant computer but also a running total of how many times each computer has requested an IP address of the DHCP server. Database 150 has an interface 252 with policy checking module 110 and allows that module to add identifying information for a noncompliant computer such as that computer's IP address and its MAC address. An interface 264 with cleanup service 310 allows the cleanup service to remove an entry for a particular computer from the blacklist once the computer is in compliance. Plug-in module 130 has an interface 152 with the blacklist that allows the plug-in to read identifying information for each computer and to read or update the "number of times" running total for each computer.

Computer System Embodiment

Figure 8A:
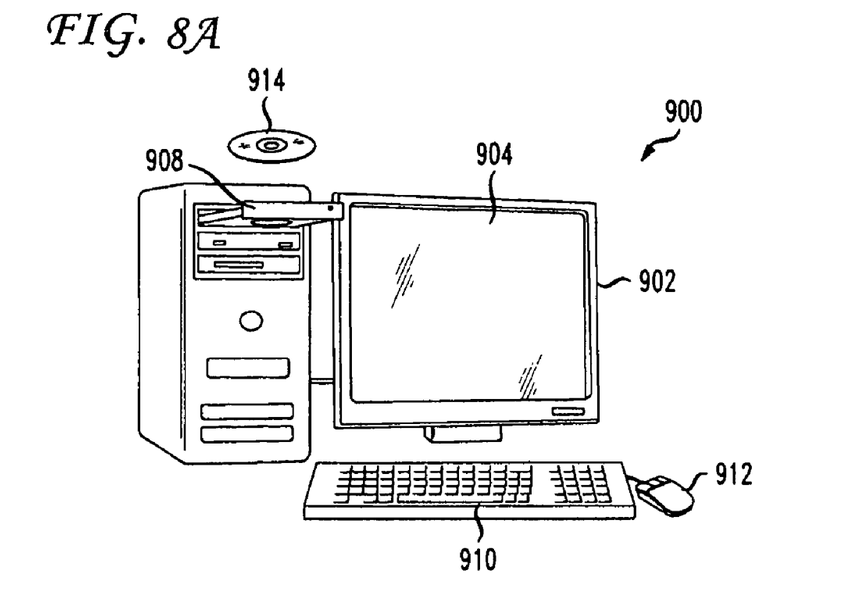
FIGS. 8A and 8B illustrate a computer system suitable for implementing embodiments of the present invention.
Figure 8B:
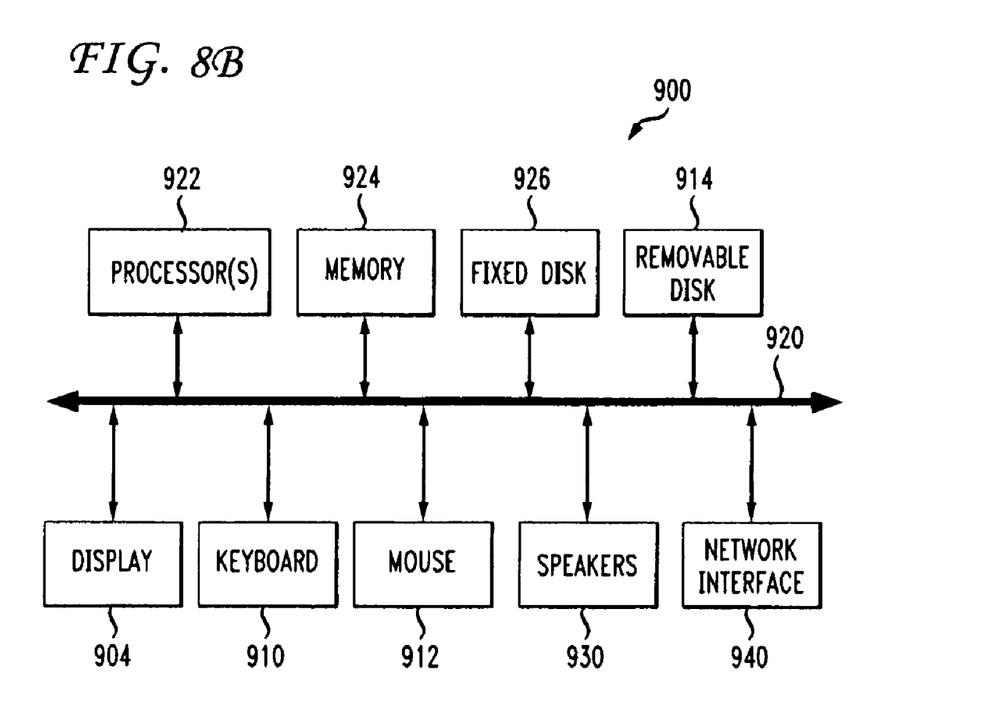

FIGS. 8A and 8B illustrate a computer system 900 suitable for implementing embodiments of the present invention. FIG. 8A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 8B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of requesting an IP address within a computer network having a security policy, said method comprising:
   receiving a request at a DHCP server to provide an IP address for an end-user computer within said computer network;
   consulting a blacklist database to determine if an identification of said end-user computer is present in said blacklist database, wherein the presence of said identification indicates that said end-user computer has previously been identified as not being compliance with said security policy of said computer network;
   determining that said identification of said end-user computer is not present in said blacklist database without undertaking an analysis of whether or not the end-user computer is actually in compliance with said security policy of said computer network;
   returning to said end-user computer an IP address and a special lease time shorter than would normally be assigned, wherein the special lease time is based upon a value for a number of times that the end-user computer has requested an IP address from the DHCP server, wherein the returned IP address provides full access privileges to said computer network;
   subsequently to the returning, probing said end-user computer to determine that the end-user computer is actually in compliance with said security policy of said computer network; and
   upon expiration of the special lease time, assigning another IP address with a lease time longer than the special lease time, wherein the another IP address provides full access privileges to said computer network.

2. A method as recited in claim 1, wherein the probing is performed using policy checking software not residing on said end-user computer.

3. A method as recited in claim 1 wherein said identification of said end-user computer is an IP address, a MAC address, or said IP address and said MAC address.

4. A method as recited in claim 1 wherein said step of returning includes
   returning to said end-user computer a special gateway IP address, said special gateway IP address effectively preventing said end-user computer from communicating with other end-user computers of said computer network and logically placing said end-user computer in a restricted network segment of said computer network.

5. A method as recited in claim 1 further comprising:
   receiving a first request at said DHCP server to provide an IP address for said end-user computer within said computer network;
   returning to said end-user computer a normal IP address; and
   after returning said normal IP address, probing said end-user computer to determine if said end-user computer complies with said security policy.

6. A method of requesting an IP address within a computer network having a security policy, said method comprising:
   receiving a request at a DHCP server to provide an IP address for an end-user computer within said computer network;
   consulting a blacklist database to determine if an identification of said end-user computer is present in said blacklist database, wherein the presence of said identification indicates that said end-user computer is not in compliance with said security policy of said computer network;
   determining that said identification of said end-user computer is not present in said blacklist database;
   determining how many times said end-user computer has requested an IP address;
   returning to said end-user computer a normal IP address and a lease time, wherein the lease time is dependent on the number of times said end-user computer has requested an IP address; and
   instructing that said end-user computer be probed with policy checking software to determine if said end-user computer complies with said security policy, wherein said policy checking software does not reside upon said end-user computer.

7. A method as recited in claim 6 further comprising:
   probing said end-user computer with said policy checking software after said step of returning;
   determining that said end-user computer is not in compliance with said security policy; and
   adding said identification of said end-user computer to said blacklist database.

8. A method as recited in claim 7 further comprising:
   instructing that a cleanup service software application remove malware from said end-user computer; and
   removing said identification of said end-user computer from said blacklist database.

9. A method as recited in claim 6 further comprising:
   determining that said end-user computer has requested an IP address a maximum number of times; and
   resetting said how many times in said blacklist database.

10. A method as recited in claim 6 further comprising:
    receiving subsequent requests from said end-user computer for an IP address; and
    returning to said end-user computer after each of said subsequent requests a normal IP address and a subsequent lease time, wherein each of said subsequent lease times is longer than a previous lease time.

11. A method as recited in claim 6 wherein said identification of said end-user computer is an IP address, a MAC address, or said IP address and said MAC address.

12. A method of enforcing a security policy within a computer network, said method comprising:
    receiving a request at a DHCP server to provide an IP address for an end-user computer within said computer network;
    returning to said end-user computer an IP address and a lease time;
    probing said end-user computer with policy checking software to determine if said end-user computer complies with said security policy, wherein said policy checking software does not reside upon said end-user computer;

determining that said end-user computer does not comply with said security policy and adding an identification of said end-user computer to a blacklist database, wherein the presence of said identification prevents said end-user computer from receiving a normal IP address;

scanning said end-user computer with cleanup service software and updating software on said end-user computer to bring said end-user computer into compliance with said security policy; and removing said identification of said end-user computer from said blacklist database.

13. A method as recited in claim 12 further comprising:

before said steps of scanning and removing, receiving another request at said DHCP server to provide an IP address for said end-user computer;

returning to said end-user computer a special IP address and a lease time, said special IP address effectively preventing said end-user computer from communicating with other end-user computers of said computer network and logically placing said end-user computer in a restricted network segment of said computer network.

14. A method as recited in claim 13 wherein said step of returning includes returning to said end-user computer a special gateway IP address, said special gateway IP address effectively preventing said end-user computer from communicating with other end-user computers of said computer network and logically placing said end-user computer in a restricted network segment of said computer network.

15. A method as recited in claim 12 wherein the logical location of said end-user computer in said restricted network segment permits routing of network packets from said end-user computer to only certain designated computers.

16. A method as recited in claim 15 wherein said designated computers includes a computer hosting said cleanup service software application.

17. A method as recited in claim 12 wherein said lease time is no more than 10 minutes.

18. A method as recited in claim 12 wherein said identification of said end-user computer is an IP address, a MAC address, or said IP address and said MAC address.

19. A method as recited in claim 12 further comprising:

performing said step of probing after said step of returning.

* * * * *